INVENTOR.
CLAY P BEDFORD

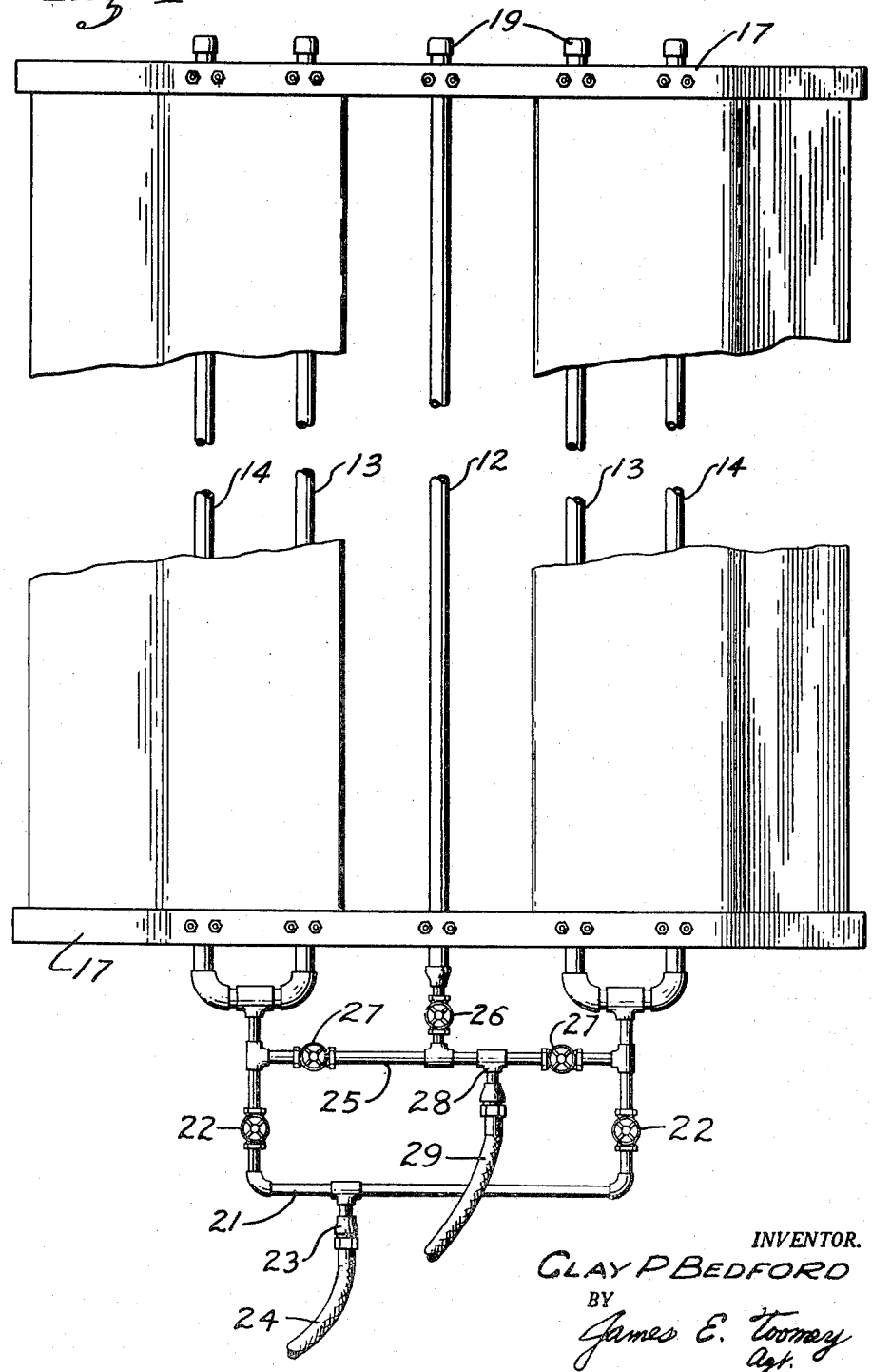

Patented Sept. 21, 1948

2,449,760

UNITED STATES PATENT OFFICE 2,449,760

APPARATUS FOR RELIEVING STRESS IN WELDED PLATES

Clay P. Bedford, Berkeley, Calif., assignor to The Kaiser Company, Oakland, Calif., a corporation of Nevada Application September 14, 1944, Serial No. 554,131

1 Claim. (Cl. 266—2)

The present invention relates to apparatus for heating welded plates and more particularly to apparatus to apply heat selectively to portions of plates while maintaining other portions of the plates relatively cool for the purpose of overcoming the effect of residual stresses resulting from joining the plates by welding.

In my co-pending application entitled Method of relieving residual welding stresses, filed June 20, 1944, S. N. 541,243, now abandoned, I disclose a method for eliminating or relieving residual welding stress in metal by the application of heat selectively to parts of the metal whereby other and adjacent parts will be permanently stretched or plastically deformed in a direction which will eliminate the cause of the stress. Metal deposited by either the gas or electric arc process of welding is in a highly superheated molten state, as are also the surfaces to be joined by the weld, and in such state the metal is expanded to a maximum. However, as the deposited metal and adjacent molten portions cool shrinkage occurs which is volumetric or, what may be termed three dimensional contraction, and the shrinking molten metal therefore draws inwardly in all directions on the base metal to which it is fused. Due to the resistance of the base metal, stresses are set up and, as in the case of steel plates used in the construction of ships where the weld is usually in the form of a long straight seam, the stress parallel to the welded joint is the greatest.

The apparent cause of the critical welding stress in ship plates is that the weld and closely adjacent strips of metal which are intensely heated during the welding operation constitute a width or band of metal with a natural or free length somewhat shorter than that of the remainder of the two plates to which the band is integrally bonded. Thus the weld and strips of metal immediately adjacent to it constitute an area that is under tension while the adjoining portions of the plates are under compression. The stress which results from these areas of tension and compression may be relieved by stretching or increasing the length of the area of metal under tension or by effecting its plastic deformation. The expression "plastic deformation" is used herein to distinguish from deformation of metal within its elastic limit. For example a piece of metal deformed within a given limit by stretching or bending will return to its original state by virtue of its elasticity. When however, its deformation exceeds the elastic limit of the metal, or what is sometimes termed yield point value, the deformation becomes permanent to a degree and the metal has become plastically deformed. According to the invention disclosed in the co-pending application hereinabove referred to the desired stretch or plastic deformation of the weld zone is effected by the application of heat to the adjacent zones of the welded plate while the weld zone is maintained cool. The adjacent zones are expanded by the heat and, because they are bonded to the weld zone, the latter is stretched. As the stretching of the weld zone exceeds the elastic limit of the metal it is permanently elongated. Upon cooling of the adjacent areas, the residual stress is eliminated or substantially reduced.

Steel plates are most often welded together to form a part of a large structure such as a ship and it is therefore not feasible to subject the plates after they have been welded to the heat of an ordinary furnace, but rather it becomes necessary to apply heat to the plates where they have been assembled and in whatever position they may assume in the structure of which they form a part.

It is the object of the present invention to provide an apparatus for heating portions of welded plates while maintaining the weld and immediately adjacent portions of the plates cool and to provide an apparatus of this kind of simple and inexpensive construction which is sufficiently light to be readily portable and which may be used against plates at any point in which they may be welded or positioned. A further object of the invention is to provide apparatus of the kind described which may be suppled with fuel for heating and with a fluid coolant, such as a gas, which is supplied by means of flexible hoses so that it may be readily moved from one position to another in treating a long weld or a series of welds. Further objects and advantages of the invention are made apparent in the following specification wherein reference is made to the accompanying drawings which illustrate the invention in its preferred form.

In the drawings

Fig. 4 is a plan view of the apparatus shown in Fig. 3 with certain parts broken away.

Figure 1:
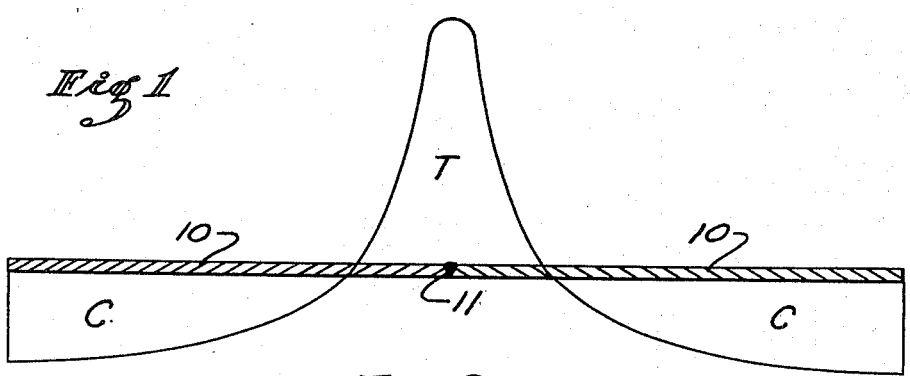
Fig. 1 is a stress diagram showing in cross section two steel plates welded together and having a stress curve superimposed thereon to illustrate the condition of stress in the plates relative to the position of the weld.

Referring first to Fig. 1 of the drawings, the stress diagram there shown illustrates the fact that two plates 10 which have been joined as by a weld 11 have an area of tension T which attains its maximum on the line of the weld and gradually diminishes as the distance from the weld increases until areas of compression C occur in the plates. In order to obtain the proper expansion of the compression area without bringing about additional residual stress, heat should be applied to the plates in accordance with the temperature distribution curve h shown in Fig. 2. As shown in this figure the temperature differential of approximately 250° F. is applied to the plate as near as possible to the lines of demarkation between the area of tension and the areas of compression and the temperature is gradually decreased toward the outer edges of the plates, or as the distance from the weld becomes greater. The temperature differential of 250° F. has been taken as typical as it has been found to be adequate to effect a reduction of residual welding stresses from about 50,000 pounds per square inch to below 20,000 pounds per square inch. While this is considered satisfactory for ordinary purposes it is indicated that an application of greater temperature differential would produce a still greater reduction in stress and the present invention is not limited to the production of a temperature differential in the order of that which is indicated as typical.

Figure 2:
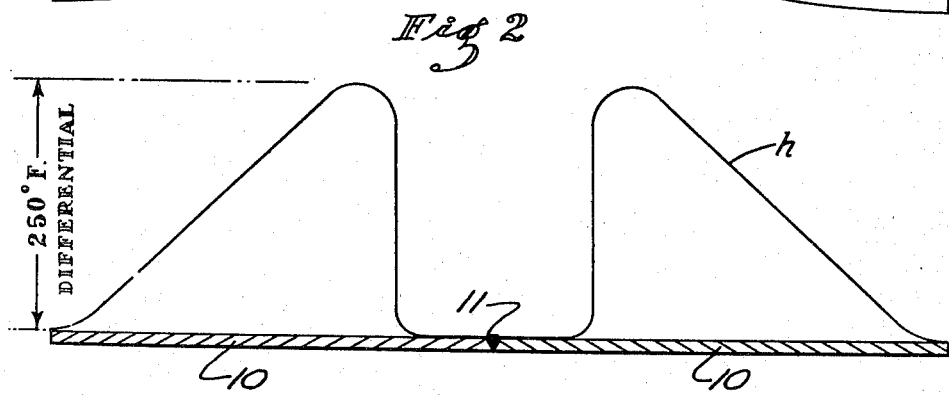
Fig. 2 is a similar diagram showing the same two plates with a temperature curve superimposed thereon and illustrating the desired application of heat to the plates for correction of the stress condition shown in Fig. 1.
Figure 3:
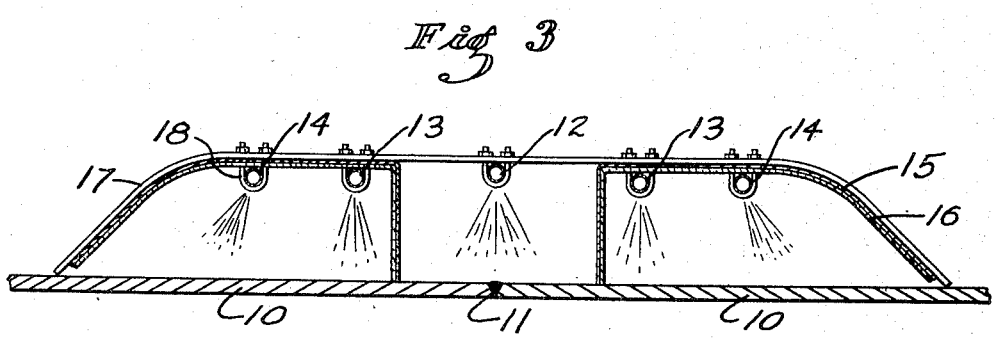
Fig. 3 is a vertical transverse sectional view of an apparatus for selectively heating certain portions of the plate and embodying the present invention.

Figs. 3 and 4 show the apparatus of the present invention which is designed to apply heat to welded plates in accordance with the temperature curve illustrated in Fig. 2.

Referring to Fig. 3 the plates 10 are shown as supporting the selective heating and cooling apparatus which comprises a central perforated pipe 12 which directs cool air onto the weld and adjacent areas of metal which constitute the tension zone. Similar pipes or burners 13 and 14 are arranged two on each side of the pipe 12 and direct gas flames against the compression zones of the plates 10. The gas burners 13 and 14 are protected by hoods which are made up of sheet metal plates 15 lined or protected on their inner sides by heat insulating material such as asbestos shown at 16. These hoods are bent downwardly at their inner sides to contact or almost contact the plates 10 along the lines of demarkation between the tension zone and the compression zones. At their outer edges the hoods are bent downwardly and outwardly at an angle to terminate somewhat short of contact with the plates 10. The hoods which thus enclose the gas burners and separate them from the cool air pipe 12 are supported by a pair of arched bars 17 to which they may be secured by bolts or rivets not shown and the extreme ends of these bars contact the plates 10 to serve as supports for the apparatus. All of the pipes 12, 13 and 14 may be supported from the bars 17 by means of U bolts such as indicated at 18. The spacing between the inner downwardly extending portions of the hoods is determined by the width of the tension zone and it has been established that the lines dividing the tension zone from the compression zones occur at about 4½" to 6" from the weld in mild steel plates varying correspondingly from ⅜" to 1½" in thickness. As this range of plate thickness may be taken as typical for ordinary structural work it may be assumed for convenience that the average zone of tension extends approximately 5½" from each side of the weld, therefore, the space between the hoods should be about 11" though this dimension applies to certain classes of work and may be widely varied to suit various conditions and circumstances. The length of the apparatus is dictated by convenience in handling. Each of the pipes 12, 13 and 14 is capped at one end as indicated at 19 in Fig. 4 and at their opposite ends each pair of pipes 13 and 14 is connected together by fittings as shown and supplied by a common gas line 21 which includes separate gas valves 22 one for each pair of pipes. The gas line 21 is provided with a fitting 23 for connection of a hose 24 which communicates with a source of fuel gas. A common air line 25 supplies cooling air to the pipe 12 and also supplies air for mixture with the fuel gas to both pairs of burners 13 and 14. A valve 26 controls the flow of air to the pipe 12 and valves 27 regulate the air which is mixed with the fuel gas. A valve 26 controls the flow of air to the pipe 12 and valves 27 regulate the air which is mixed with the fuel gas. A fitting 28 in the line 25 supports a coupling for connection of a hose 29 which communicates with a source of air under pressure.

In operation the flexible gas hose 24 and air hose 29 are connected to the apparatus as shown which is then set up over the plate to be treated with the air pipe 12 lying on a line directly above the weld 11. This pipe is perforated to direct cooling air against the weld and adjacent portions of the plates. The gas from the pipes 13 is directed downwardly or at right angles to the plate while the gas from the pipes 14 is directed outwardly at an angle of approximately 50° to normal so that the greatest heat under the hood is applied to the plates directly adjacent the lines of demarkation between the tension and compression zones and the heat is gradually reduced as the distance from these lines increases. Thus, due to the baffle effect of the downwardly extending portions of the inner edges of the hoods, the tension zone is maintained cool by the air while the compression zones are heated as indicated by the temperature curve h in Fig. 2.

As the construction of the apparatus herein disclosed is light it may readily be moved from place to place and it may be conveniently used against plates which have been assembled to form a vertical bulk-head or wall, or even against a deck-head or ceiling in an inverted position if necessary. All of the pipes which supply air and gas to the respective burners, as well as the control valves therefore are fastened to and supported by the main pipes 12, 13 and 14 and the only connection with the source of air and gas under pressure used as a coolant and fuel are the flexible hoses 24 and 29. Consequently the apparatus is readily portable over the length of a long welded seam or between welds located at different positions.

What I claim is:

Apparatus for relieving residual stresses in metal plates joined by a weld comprising, a plurality of inverted channel-shaped frame members adapted to be supported on said plates, a pair of substantially parallel heat retaining hoods secured to and spaced apart by said frame members so as to provide an open space therebetween, each of said hoods including a vertically disposed inner baffle portion and an angularly disposed outer baffle portion, fluid discharge means supported within said open space by said frame members extending along a substantial length of said weld in such a manner as to deliver a cooling fluid to said weld and to a tension zone immediately adjacent to said weld and lying on both sides thereof, a plurality of longitudinally aligned burners supported by said frame members within each of said hoods and extending substantially the length of said weld, each of said burners having a plurality of fluid discharge jets, the jets in the burner close to the vertically disposed inner baffle being directed substantially vertically downwardly and the discharge jets in the burner disposed toward the outer baffle being directed outwardly at an angle so that the greatest heat under the hood is applied to the plates directly adjacent the lines of demarcation between the tension and compression zones, and the heat applied is gradually reduced as the distance from these lines increases.

CLAY P. BEDFORD.

REFERENCES CITED

The following references are of record in the file of this patent:

UNITED STATES PATENTS

| Number | Name | Date |
|---|---|---|
| 1,277,262 | Sandberg | Aug. 27, 1918 |
| 1,889,780 | Frickey | Dec. 6, 1932 |
| 2,044,734 | Newhouse | June 16, 1936 |
| 2,065,627 | Taylor | Dec. 29, 1936 |
| 2,208,121 | Davis | July 16, 1940 |
| 2,227,476 | Williams et al. | Jan. 7, 1941 |
| 2,254,307 | Mott et al. | Sept. 2, 1941 |
| 2,315,558 | Somes | Apr. 6, 1943 |

OTHER REFERENCES

Welding Handbook (1942), Am. Weld. Soc., pp. 1080–1084, 1091.